(12) United States Patent
White

(10) Patent No.: US 6,719,306 B2
(45) Date of Patent: Apr. 13, 2004

(54) SPORTS EQUIPMENT CART

(76) Inventor: Larry J. White, 739 Emerald Dr., Lindsborg, KS (US) 67456

( * ) Notice: Subject to any disclaimer, the term of this patent is extended or adjusted under 35 U.S.C. 154(b) by 35 days.

(21) Appl. No.: 10/170,805

(22) Filed: Jun. 13, 2002

(65) Prior Publication Data

US 2003/0042695 A1 Mar. 6, 2003

Related U.S. Application Data

(63) Continuation-in-part of application No. 09/944,997, filed on Aug. 31, 2001, now Pat. No. 6,663,119.

(51) Int. Cl.[7] .............................. B62B 1/00; A47F 7/00; A47F 1/04; B60R 9/00; A63B 55/00
(52) U.S. Cl. ............................... 280/47.26; 280/47.34; 211/15; 224/274; 221/309; 206/315.5
(58) Field of Search ......................... 280/DIG. 6, 47.26, 280/47.34, 47.35, 47.131; 224/274; 206/315.1, 315.3, 315.5; 220/476, 480, 481; 248/224.31, 224.41, 225.21, 692; 211/85.7, 85.8, 13.1, 15; 221/309

(56) References Cited

U.S. PATENT DOCUMENTS

| | | | |
|---|---|---|---|
| 2,664,933 A | * 1/1954 | Gielow | .................... 206/315.5 |
| 3,010,775 A | 11/1961 | Giovannelli | |
| 4,082,209 A | * 4/1978 | Sanders | ....................... 224/274 |
| 4,227,710 A | 10/1980 | Laub | |
| 4,344,660 A | 8/1982 | Molnar et al. | |
| 4,595,226 A | 6/1986 | Wessel | |
| 4,629,065 A | 12/1986 | Braaten | |
| 4,890,731 A | 1/1990 | Mroz | |
| 5,074,571 A | * 12/1991 | Reese | ....................... 280/47.19 |
| 5,086,948 A | * 2/1992 | Slusarz | ....................... 221/185 |
| 5,224,602 A | 7/1993 | Bettles et al. | |
| D340,565 S | * 10/1993 | Klopfenstein | ................ D34/25 |
| 5,462,328 A | 10/1995 | Chandler et al. | |
| 5,797,612 A | 8/1998 | Buccioni | |
| 5,975,293 A | 11/1999 | Fowler | |
| 5,988,433 A | * 11/1999 | Crum | .......................... 221/309 |
| 6,267,461 B1 | 7/2001 | Dunagan et al. | |
| 6,439,424 B1 | * 8/2002 | Threadgill, Jr. | .............. 221/185 |
| 6,481,595 B1 | * 11/2002 | Chilton | ....................... 221/185 |

* cited by examiner

Primary Examiner—Brian L. Johnson
Assistant Examiner—G B Klebe
(74) Attorney, Agent, or Firm—Dale J. Ream

(57) ABSTRACT

A sports equipment cart includes a first ball dispensing tube having upper and lower ends and defining a bore extending therebetween. The first ball dispensing tube defines an upper ball receiving aperture and a lower ball dispensing aperture. A pair of wheels are rotatably mounted to the first ball dispensing tube adjacent the lower end thereof. The first ball dispensing tube includes a handle for manually pulling the tube between desired locations. A second ball dispensing tube of substantially similar dimensions may be connected to the first ball dispensing tube in side-by-side relationship. A third ball dispensing tube of smaller dimension may also be connected to the first dispensing tube for holding smaller sized balls.

6 Claims, 7 Drawing Sheets

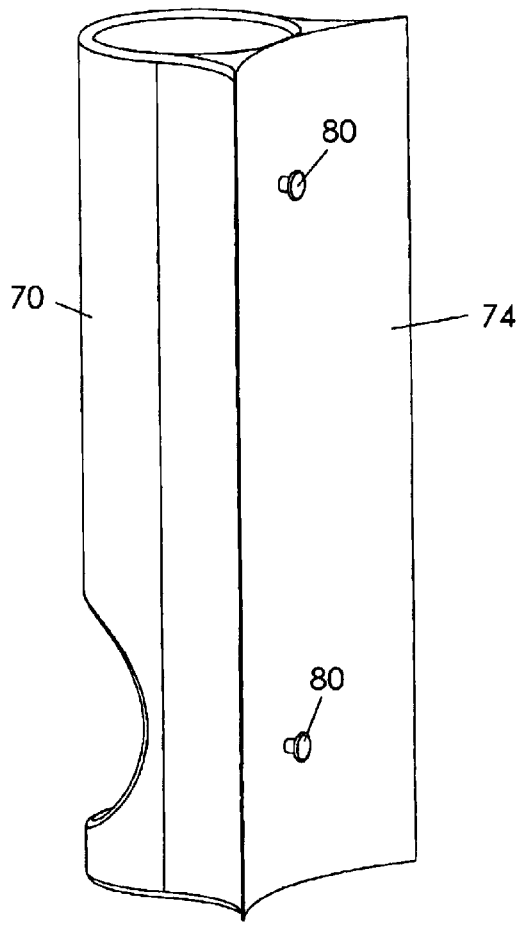
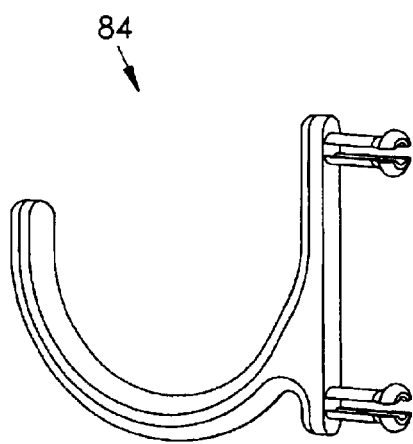
FIG. 12
FIG. 11

US 6,719,306 B2

SPORTS EQUIPMENT CART

CROSS REFERENCE TO RELATED APPLICATION

This application is a continuation-in-part of application Ser. No. 09/944,997 filed on Aug. 31, 2001 now U.S. Pat. No. 6,663,119 issued Dec. 16, 2003 incorporated herein.

BACKGROUND OF THE INVENTION

This invention relates generally to rollable carts and, more particularly, to a mobile sports cart capable of storing various sports equipment and for both storing and dispensing sports balls of various sizes.

Sports equipment such as balls, bats, rackets, gloves, and the like are often stored for transportation in bags, tubs, or bulky bins. Although assumably effective for their intended purposes, the existing storage devices are typically suitable for a single type of sports equipment or are not conveniently transportable. Further, existing devices are not well-suited to accommodate multiple types of sports equipment while also providing for the dispensing of balls of multiple sizes.

Therefore, it is desirable to have a sports equipment cart that is capable of storing many types of sports equipment and capable of storing and dispensing balls of various sizes. Further, it is desirable to have a sports equipment cart that is mobile and may be pulled to desired storage or use locations.

SUMMARY OF THE INVENTION

Accordingly, a sports equipment cart according to the present invention includes a first (primary) ball dispensing tube having upper and lower ends and which defines a bore therebetween. The primary ball dispensing tube defines an upper ball receiving aperture and a lower ball dispensing aperture. Thus, balls may be inserted into the upper ball receiving aperture for storage within the primary tube or may be removed from the lower ball dispensing aperture for use. The primary ball dispensing tube is preferably sized to receive basketballs although footballs, soccer balls, four-square balls, and the like may be stored in and dispensed from the primary tube as well. One or more auxiliary ball dispensing tubes may be releasably coupled to the primary ball dispensing tube, the auxiliary tubes having dimensions smaller than the dimensions of the primary tube and particularly configured for storage and dispensing of smaller balls like baseballs, softballs, or tennis balls. A pair of wheels are rotatably mounted to the primary ball dispensing tube and a handle is fixedly attached to or integral with the primary ball dispensing tube such that the tube may be pulled or pushed to a desired storage or use location.

Therefore, a general object of this invention is to provide a sports equipment cart for holding a plurality of types of sports equipment and having a primary ball dispensing tube for dispensing sports balls stored therein.

Another object of this invention is to provide a sports equipment cart, as aforesaid, having wheels such that the primary ball dispensing tube may be moved to and from selected storage and use locations.

Still another object of this invention is to provide a sports equipment cart, as aforesaid, having a handle for pulling or pushing the primary ball dispensing tube.

A further object of this invention is to provide a sports equipment cart, as aforesaid, having auxiliary ball dispensing tubes for storing and dispensing balls of different sizes.

A still further object of this invention is to provide a sports equipment cart that is mechanically simple and economical to manufacture.

Other objects and advantages of this invention will become apparent from the following description taken in connection with the accompanying drawings, wherein is set forth by way of illustration and example, embodiments of this invention.

BRIEF DESCRIPTION OF THE DRAWINGS

FIG. 11 is a rear perspective view of an auxiliary ball dispensing tube removed from the primary ball dispensing tube shown in FIG. 1;

FIG. 12 is a perspective view on an enlarged scale of a hook fastener removed from the primary ball dispensing tube shown in FIG. 1.

DESCRIPTION OF THE PREFERRED EMBODIMENT

Figure 1:
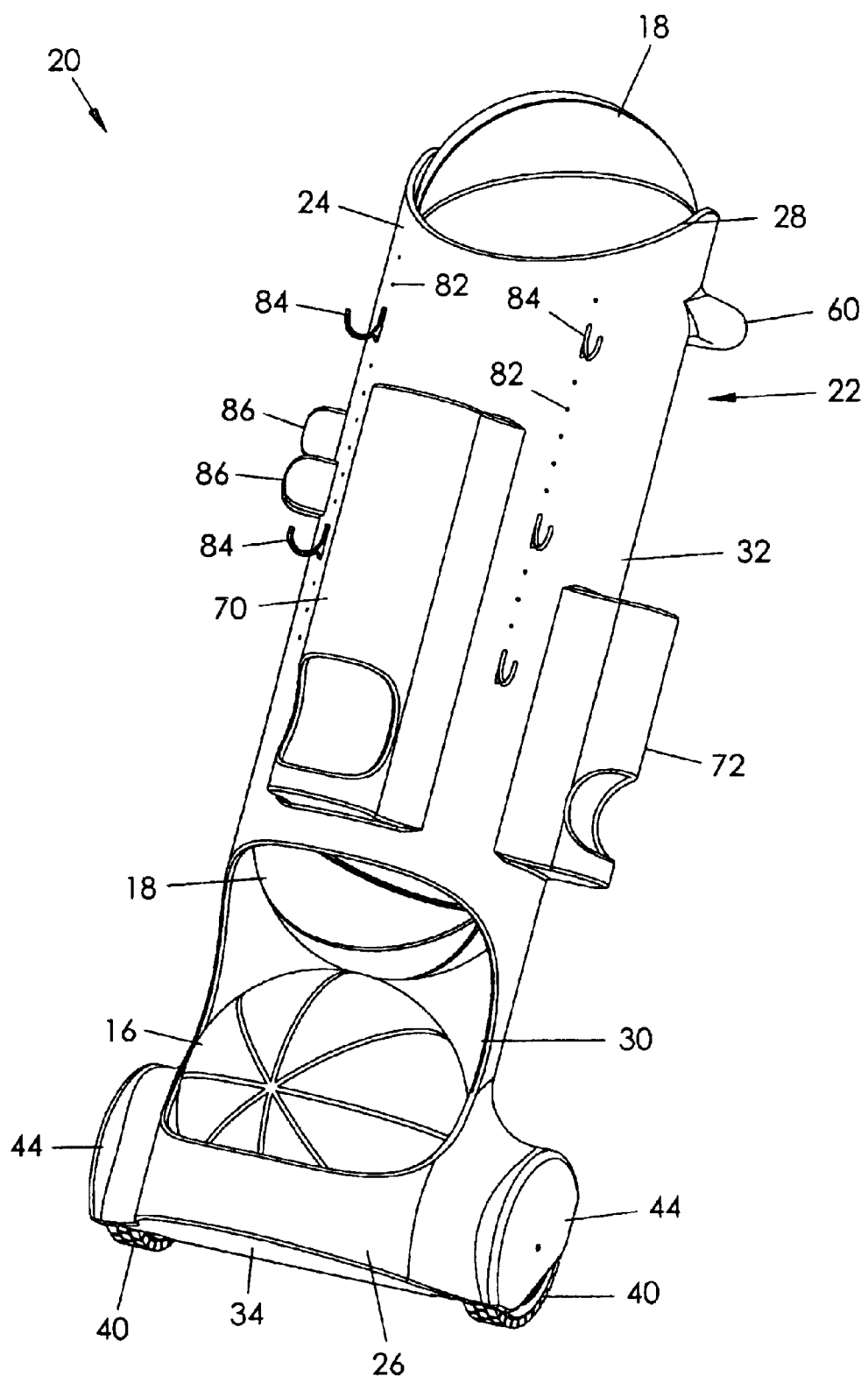
FIG. 1 is a perspective view of a sports equipment cart according to one embodiment of the present invention.
Figure 2:
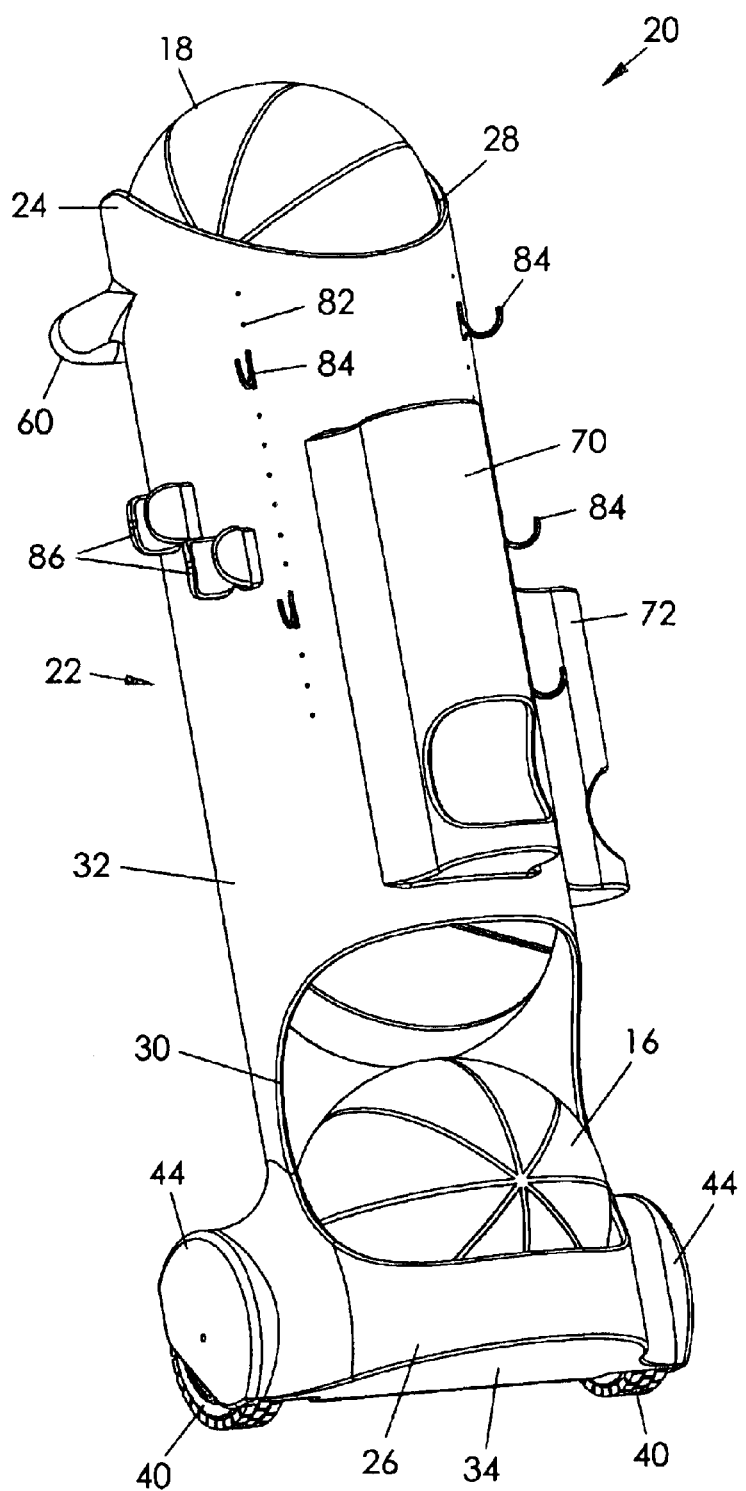
FIG. 2 is a perspective view from another angle of the cart as in FIG. 1.

A sports equipment cart according to the present invention will now be described in detail with reference to FIGS. 1–13 of the present invention. A sports equipment cart 20 according to one embodiment of the present invention includes a first/primary ball dispensing tube 22 having a generally hollow, cylindrical configuration (FIGS. 1 and 2). The primary ball dispensing tube 22 includes opposed upper 24 and lower 26 ends and defines a bore therebetween. Preferably, the primary tube 22 is fabricated of a polyvinyl chloride plastic tubing although other similar materials would be suitable. The primary tube 22 defines an upper ball receiving aperture 28 at the upper end 24 thereof such that the upper end of the tube is open and may receive balls therein. It is understood that while the primary tube 22 and the upper ball receiving aperture 28 preferably present a diameter complementary to receiving basketballs, four-square balls, soccer balls, and the like, it may be fabricated with a diameter suited for balls of other sizes.

The primary tube 22 is formed by a continuous side wall 32 having a generally annular configuration (FIG. 1). The side wall 32 defines a lower ball dispensing aperture 30 adjacent the lower end 30 having a saddle shaped configuration. It should be appreciated, however, that the lower ball dispensing aperture 30 may present any configuration so long as its diameter is substantially similar to a diameter of the primary tube 22 so that a ball stored in the primary tube 22 may be dispensed therethrough.

Figure 3:
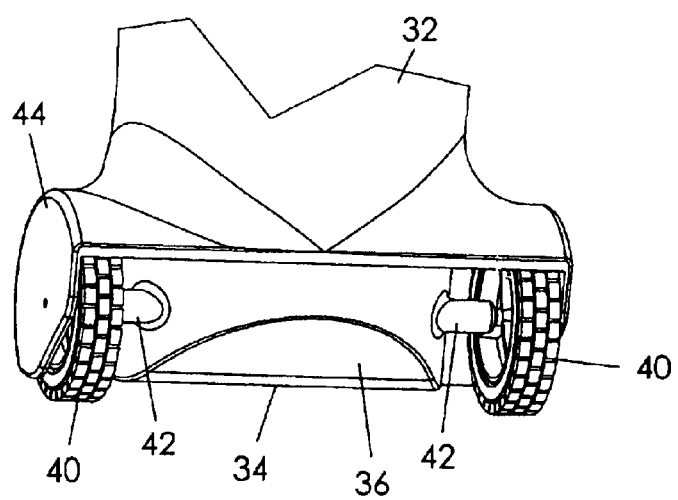
FIG. 3 is a fragmentary rear view of a wheel assembly of a cart as in FIG. 1.

The primary ball dispensing tube 22 includes a bottom wall 34 that is generally perpendicular to the side wall 32 and which establishes a closed bottom relative to the bore (FIG. 2). The bottom wall 34 includes a slanted portion 36 situated adjacent the rear of the side wall 32 for urging a ball toward the lower ball dispensing aperture 30 (FIG. 3). The lower edge of the lower ball dispensing aperture 30 is slightly upwardly spaced from the bottom wall 34 such that a first ball 16 stored in the primary tube 22 rests upon the bottom wall 34 but is inhibited from being unintentionally dispensed from the lower ball dispensing aperture 30. It is understood that the upper ball receiving aperture 28 and lower ball dispensing aperture 30 may be lined with flexible "C" channel trim (not shown). And, the lower ball dispensing aperture may be selectively covered with a door, net, or the like (not shown) to ensure that no balls are unintentionally dispensed during transport, say, in a car trunk.

The primary ball dispensing tube 22 includes a pair of wheels 40 rotatably mounted to the lower end 30 of the primary tube (FIG. 1). More particularly, a pair of hubs 42 are mounted to opposing sides of the primary tube, the pair of wheels 40 being rotatably coupled to respective hubs (FIG. 3). The pair of wheels 40 are mounted toward the rear of the primary tube 22 such that the primary tube 22 may be tilted rearward onto the wheels 40 when the primary tube 22 is to be rolled to a new location, as to be described more filly later. The pair of wheels 40 may be substantially covered with wheel guards 44 fixedly attached to or integral with the side wall 32 (FIGS. 2 and 3).

Figure 4:
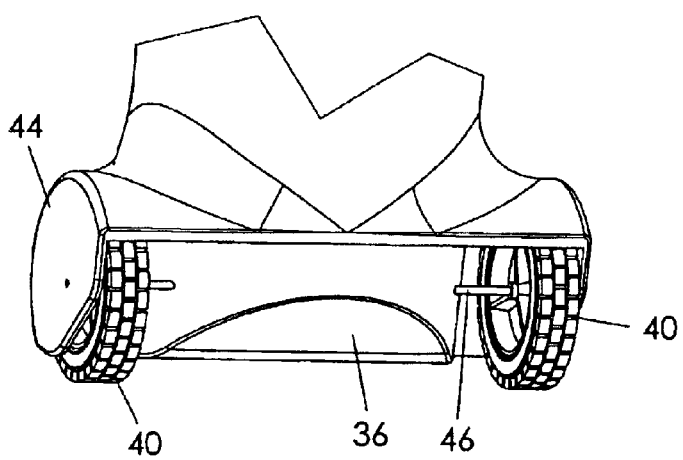
FIG. 4 is a fragmentary view of a wheel assembly according to another embodiment of the present invention.
Figure 5:
FIG. 5 is a fragmentary view of a wheel assembly of a cart according to still another embodiment of the present invention.
Figure 6:
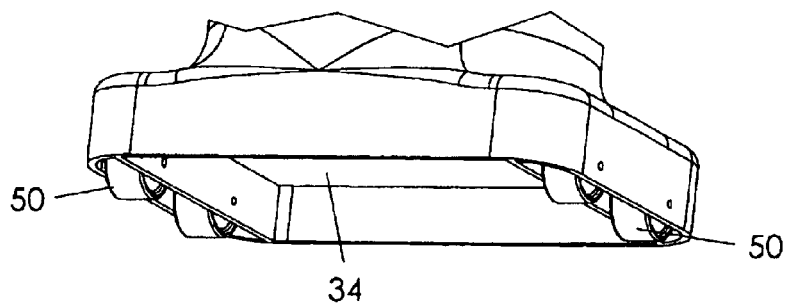
FIG. 6 is a fragmentary view of a wheel assembly of a cart according to yet another embodiment of the present invention.
Figure 7:
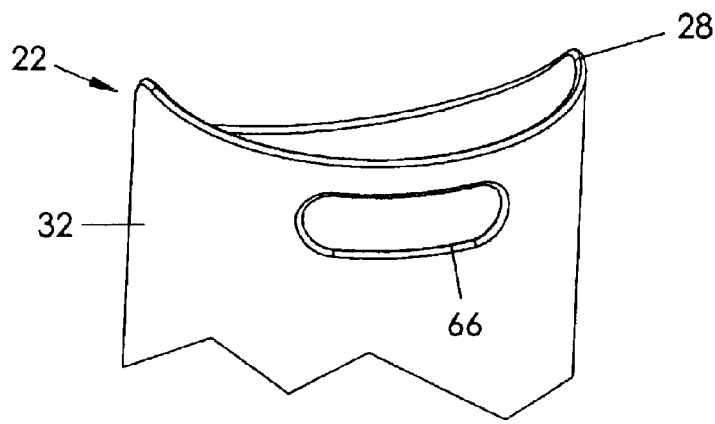
FIG. 7 is a fragmentary view of a handle aperture of a cart according to another embodiment of the invention.

Alternatively, the means for attaching the pair of wheels 40 to the primary tube 22 may include an elongate axle 46 which extends through the lower end 30 of the side wall 32 and interconnects the pair of wheels 40 (FIG. 4). Or, the pair of wheels 40 may be casters 48 attached to short axles that are rotatably nested within the bottom surface of the bottom wall 34 (FIG. 5). Of course, a plurality of wheels may be mounted in this manner such that the primary tube 22 may rest entirely upon its wheels. Still another embodiment of the wheel assembly includes a plurality of casters 50 mounted along side walls depending from the bottom wall 34 (FIG. 6). Of course, other wheel arrangements would also work.

Figure 8:
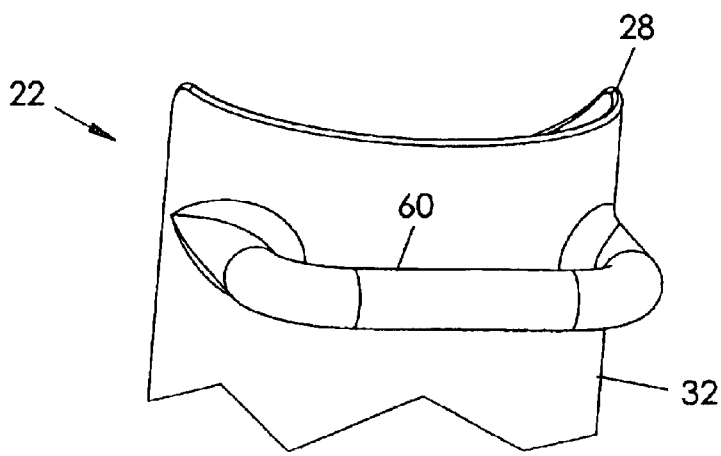
FIG. 8 is a fragmentary view of a handle member as in FIG. 1.
Figure 9:
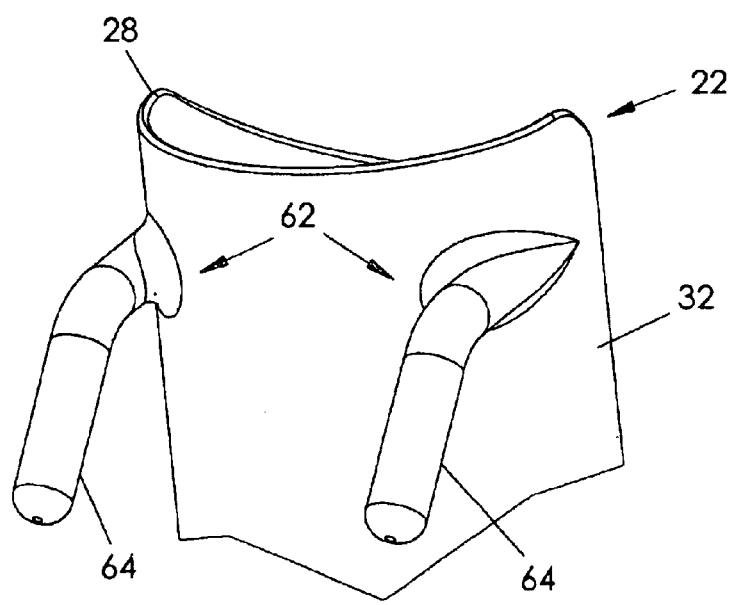
FIG. 9 is a fragmentary view of a handle member of a cart according to still another embodiment of the invention.

The sports equipment cart 20 further includes a handle member 60 fixedly attached to the rear surface of the side wall 32 adjacent the upper end 24 (FIG. 8). More particularly, the handle member 60 presents a single piece construction having a generally U-shaped lateral configuration with opposing ends fixedly attached to the side wall 32. Alternatively, the handle member 62 includes a pair of handles 64 fixedly attached to the rear surface of the side wall 32 adjacent the upper end 24 and extending rearwardly in a parallel configuration (FIG. 9). Or, the side wall 32 may define a laterally oblongated handle aperture 66 lined with flexible "C" channel trim (FIG. 7), said handle aperture 66 serving as a simple and economically constructed hand hold.

Figures 10A, 10B:
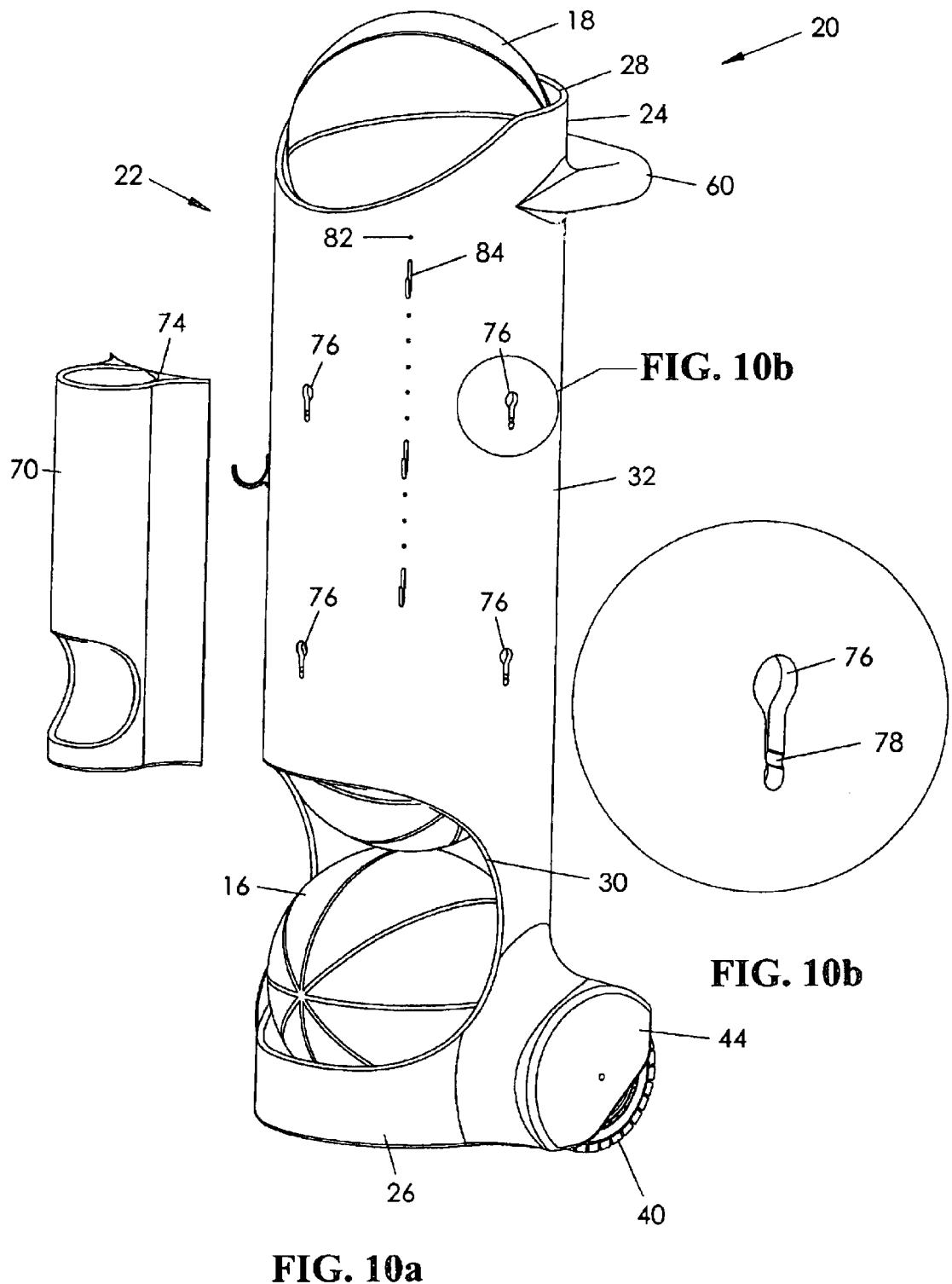
FIG. 10a is a perspective view of the cart as in FIG. 1 with an auxiliary ball dispensing tube released from the cart.
FIG. 10b is a perspective view of a fastening recess on an enlarged scale.

Smaller sized auxiliary ball dispensing tube 70, 72 are releasably attached to the side wall 32 of the primary tube 22 (FIG. 1) although a fixed attachment would also work. Each auxiliary tube 70, 72 includes length and diameter dimensions that are less than a length and diameter of the primary tube although their constructions are otherwise substantially similar to that of the primary tube 22. Each auxiliary tube 70, 72 includes ball receiving and ball dispensing openings. Thus, the auxiliary tubes 70, 72 are well-suited for holding smaller balls such as baseballs, softballs, or tennis balls. Each auxiliary tube includes a rear surface 74 having an annular configuration that is complementary to the annular configuration of the side wall 32 of the primary tube 22 so as to have a flush engagement therewith. Further, the side wall 32 presents a plurality of keyhole shaped apertures 76 (FIG. 10a). A plurality of posts 80 are fixedly attached to the rear surface 74 of each auxiliary tube (FIG. 11), each post being configured to releasably mate with a respective keyhole aperture 76. In addition, each keyhole aperture 76 may define a nub 78 at a lower portion thereof such that a respective post 80 is snappably retained therein (FIG. 10b).

The side wall 32 of the primary tube 22 defines a plurality of peg receiving apertures 82, such apertures 82 being sized and positioned similar to those of a workshop peg board (FIG. 10b). A plurality of hook brackets 84 are removably mounted within selected peg receiving apertures 82 and may thereby be adjustably positioned. Numerous types of sports equipment, such as baseball gloves (not shown), tennis rackets (not shown), and the like, may be stored upon the hook brackets 84.

Further, at least one C-shaped bracket 86, preferably constructed of PVC plastic, is releasably coupled to the side wall 32 of the primary tube (FIG. 2). The C-shaped bracket 86 is configured to conveniently store and dispense a baseball bat (not shown).

In use, larger sports balls such as basketballs 18, four-square balls, and soccer balls may be deposited into the primary ball dispensing tube 22 through the upper ball receiving aperture 28 and stored therein (FIG. 1). The first ball 16 is urged toward the lower ball dispensing aperture 30 by the slanted portion 36 of the bottom wall 34 although it is not able to be unintentionally dispensed therefrom since the lower ball dispensing aperture 30 is upwardly spaced from the bottom wall 34. Smaller balls, such as baseballs, softballs, or tennis balls, may be stored within the auxiliary tubes 70, 72 in like manner, the auxiliary tubes being releasably coupled to the side wall 32 of the primary tube 22 (FIG. 1). Balls stored either in the primary tube 22 or auxiliary tubes 70, 72 may be manually dispensed to a user as desired. Upon removing a ball from a selected lower ball dispensing aperture 30, the next successive ball stored above falls down to replace the dispensed ball and becomes next in line to be dispensed. Upon rearward tilting of the primary tube 22, the primary tube may be rolled upon the pair of wheels 40 to a desired location for use or storage.

Figure 13:
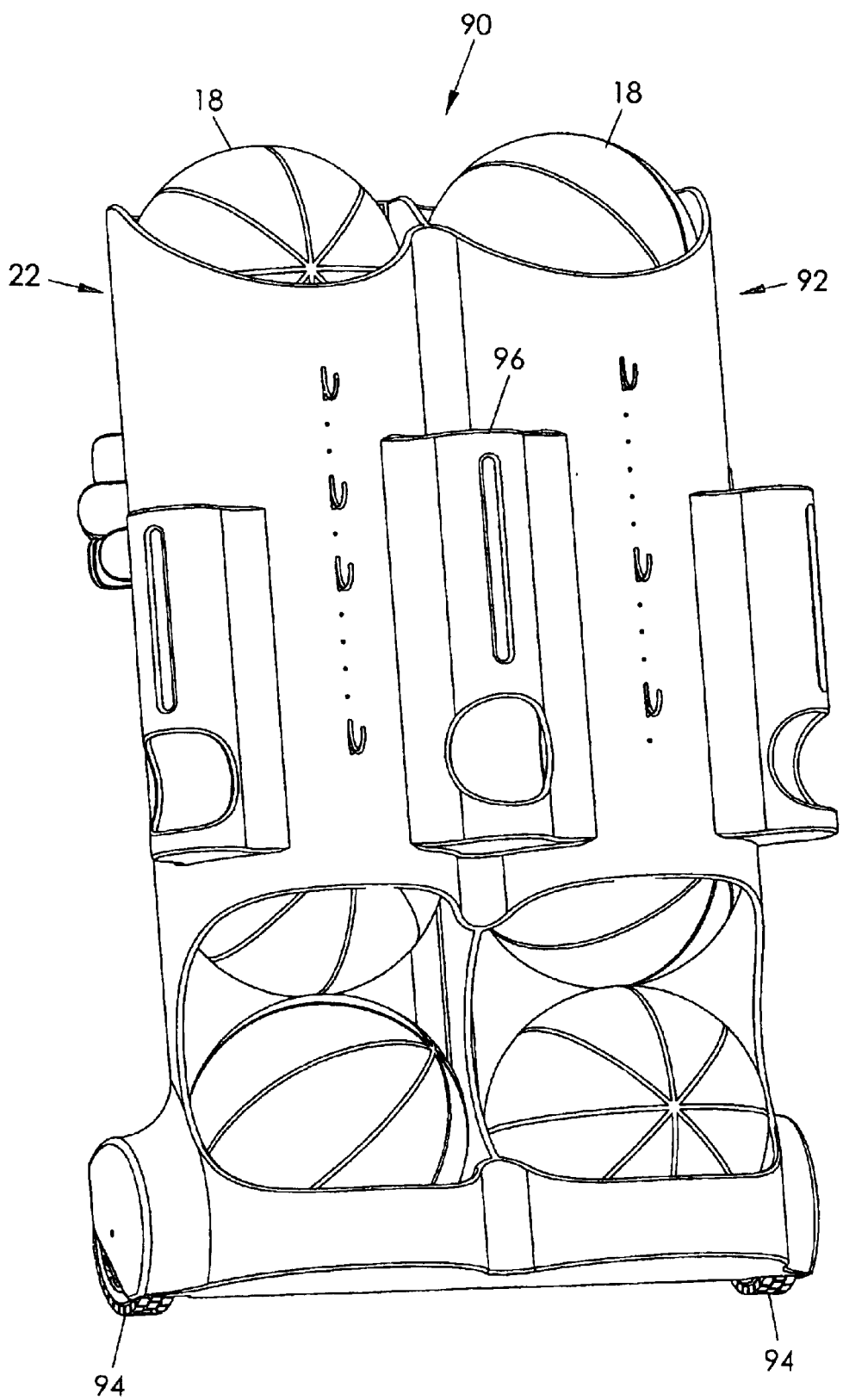
FIG. 13 is a perspective view of a sports equipment cart according to still another embodiment of the present invention.

A sports equipment cart 90 according to another embodiment of the invention is shown in FIG. 13 and includes a construction substantially similar to the construction of the sports equipment cart 20 first described above except as specifically noted below. The sports equipment cart 90 according to this embodiment includes a third ball dispensing tube 92 fixedly attached to the first/primary ball dispensing tube 22 although it would also be suitable for the third tube 92 to be releasably coupled to the first tube 22. More particularly, the third tube 92 includes length and diameter dimensions that are substantially similar to a length and diameter of the first tube 22, the first and third tubes being configured in parallel relationship. In addition, a pair of wheels 94 may be rotatably coupled to respective outer sides of the first and third tubes adjacent respective lower ends thereof so that both tubes may be tilted back and transported together by the pair of wheels 94. An auxiliary tube 96 may include a rear surface having a configuration suitable to be releasably coupled simultaneously to both the first 22 and third 92 tubes (FIG. 13). In use, this sports equipment cart 90 is able to conveniently store and dispense twice as many balls and other sports equipment. It is contemplated that multiple ball dispensing tubes of substantially similar length and diameter may be connected together, perhaps in a circular arrangement, with the tubes being mobile using casters on the bottoms of the tubes, or other wheel means.

It is understood that while certain forms of this invention have been illustrated and described, it is not limited thereto except insofar as such limitations are included in the following claims and allowable functional equivalents thereof.

Having thus described the invention, what is claimed as new and desired to be secured by Letters Patent is as follows:

1. A sports equipment cart, comprising:

a first ball dispensing tube having upper and lower ends and defining a bore extending between said upper and lower ends, said first ball dispensing tube defining an upper ball receiving aperture at said upper end, said first ball dispensing tube having an annular continuous side wall extending between said upper and lower ends thereof and defining a lower ball dispensing aperture upwardly spaced from said lower end, said side wall forming a lip at said lower end adapted to prevent unintended dispensing of balls through said lower ball dispensing aperture;

a pair of wheels rotatably mounted to said first ball dispensing tube proximate said lower end thereof; and means positioned in said first ball dispensing tube adjacent said lower end thereof for urging balls toward said lower ball dispensing aperture, wherein said means for urging balls toward said lower ball dispensing aperture includes an axle extending through said first ball dispensing tube adjacent said lower end thereof and interconnecting said pair of wheels, said axle positioned rearward from said lower ball dispensing aperture so as to direct balls toward said lower ball dispensing aperture.

2. The sports equipment cart as in claim 1 further comprising a second ball dispensing tube attached to said first ball dispensing tube, said second ball dispensing tube having a length and diameter smaller than a respective length and diameter of said first ball dispensing tube.

3. The sports equipment cart as in claim 2 wherein said second ball dispensing tube includes a rear surface releasably coupled to said side wall of said first ball dispensing tube, said rear surface having a configuration complementary to a configuration of said side wall for flush engagement therewith.

4. The sports equipment cart as in claim 2 further comprising a third ball dispensing tube coupled to said first ball dispensing tube, said third ball dispensing tube having a length and diameter substantially similar to a respective length and diameter of said first ball dispensing tube.

5. The sports equipment cart as in claim 1 further comprising a second ball dispensing tube connected to said first ball dispensing tube in a side by side configuration, said second ball dispensing tube having a length and diameter substantially similar to a respective length and diameter of said first ball dispensing tube.

6. The sports equipment cart as in claim 1 further comprising manual pulling means fixedly attached to said side wall at said upper end of said first ball dispensing tube.

* * * * *